(12) United States Patent
Lim et al.

(10) Patent No.: US 12,168,428 B2
(45) Date of Patent: Dec. 17, 2024

(54) ELECTRIC PARKING BRAKE

(71) Applicant: HL MANDO CORPORATION, Pyeongtaek-si (KR)

(72) Inventors: Woochul Lim, Gyeonggi-do (KR); Joon-kyu Song, Gyeonggi-do (KR); Daejune Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 350 days.

(21) Appl. No.: 17/691,975

(22) Filed: Mar. 10, 2022

(65) Prior Publication Data
US 2022/0297660 A1  Sep. 22, 2022

(30) Foreign Application Priority Data
Mar. 16, 2021 (KR) .................. 10-2021-0034007

(51) Int. Cl.
| | | |
|---|---|---|
| *B60T 13/74* | (2006.01) | |
| *F16D 55/02* | (2006.01) | |
| *F16D 65/18* | (2006.01) | |
| *F16D 121/24* | (2012.01) | |
| *F16D 125/40* | (2012.01) | |

(Continued)

(52) U.S. Cl.
CPC ............ *B60T 13/746* (2013.01); *F16D 55/02* (2013.01); *F16D 65/183* (2013.01); *F16D 2121/24* (2013.01); *F16D 2125/40* (2013.01); *F16D 2125/50* (2013.01); *F16D 2125/52* (2013.01)

(58) Field of Classification Search
CPC ...... B60T 13/746; F16D 55/02; F16D 65/183; F16D 2121/24; F16D 2125/40; F16D 2125/50; F16D 2125/52
See application file for complete search history.

(56) References Cited

U.S. PATENT DOCUMENTS 3,703,944 A * 11/1972 Hendrickson ........... F16D 65/18
188/106 F
4,181,199 A * 1/1980 Flotow .................. F16D 55/224
188/72.9

(Continued)

FOREIGN PATENT DOCUMENTS

| CN | 112240361 | 1/2021 |
|---|---|---|
| KR | 10-2011-0072877 | 6/2011 |

(Continued)

OTHER PUBLICATIONS

Office Action dated Jan. 29, 2024 for Chinese Patent Application No. 202210251615.6 and its English translation from Global Dossier.

*Primary Examiner* — Nicholas J Lane
(74) *Attorney, Agent, or Firm* — Womble Bond Dickinson (US) LLP

(57) ABSTRACT

Disclosed herein an electric parking brake includes a pair of pressing portions provided in a caliper housing to convert rotational motion into linear motion to press a brake pad; an actuator configured to transmit power to the pair of pressing portions; and a load control portion provided rotatably between the pair of pressing portions and the actuator, the load control portion applying a uniform load to the pair of pressing portions by pressing any one of the pair of pressing portions that generates a less load during braking operation.

8 Claims, 9 Drawing Sheets

(51) Int. Cl.
 *F16D 125/50* (2012.01)
 *F16D 125/52* (2012.01)

(56) References Cited

U.S. PATENT DOCUMENTS

| | | | | |
|---|---|---|---|---|
| 4,804,073 | A * | 2/1989 | Taig | F16D 65/18 475/342 |
| 2009/0294224 | A1* | 12/2009 | Sakashita | F16D 65/568 188/72.2 |
| 2014/0090934 | A1* | 4/2014 | Pritz | F16D 65/567 188/72.4 |
| 2015/0129371 | A1* | 5/2015 | Gutelius | F16D 55/228 188/72.1 |
| 2015/0144438 | A1* | 5/2015 | Park | F16D 65/18 188/72.1 |
| 2015/0354651 | A1* | 12/2015 | Park | F16D 55/228 188/72.1 |
| 2017/0219036 | A1 | 8/2017 | Song | |
| 2020/0309213 | A1* | 10/2020 | Al-Mahshi | F16D 65/183 |
| 2021/0016760 | A1* | 1/2021 | Hong | F16D 55/226 |
| 2021/0222746 | A1* | 7/2021 | Tarandek | F16D 55/2262 |
| 2022/0297654 | A1* | 9/2022 | Chelaidite | F16D 55/226 |

FOREIGN PATENT DOCUMENTS

| | | |
|---|---|---|
| KR | 10-1841008 | 3/2018 |
| KR | 10-2022403 | 9/2019 |

* cited by examiner

[FIG. 1]
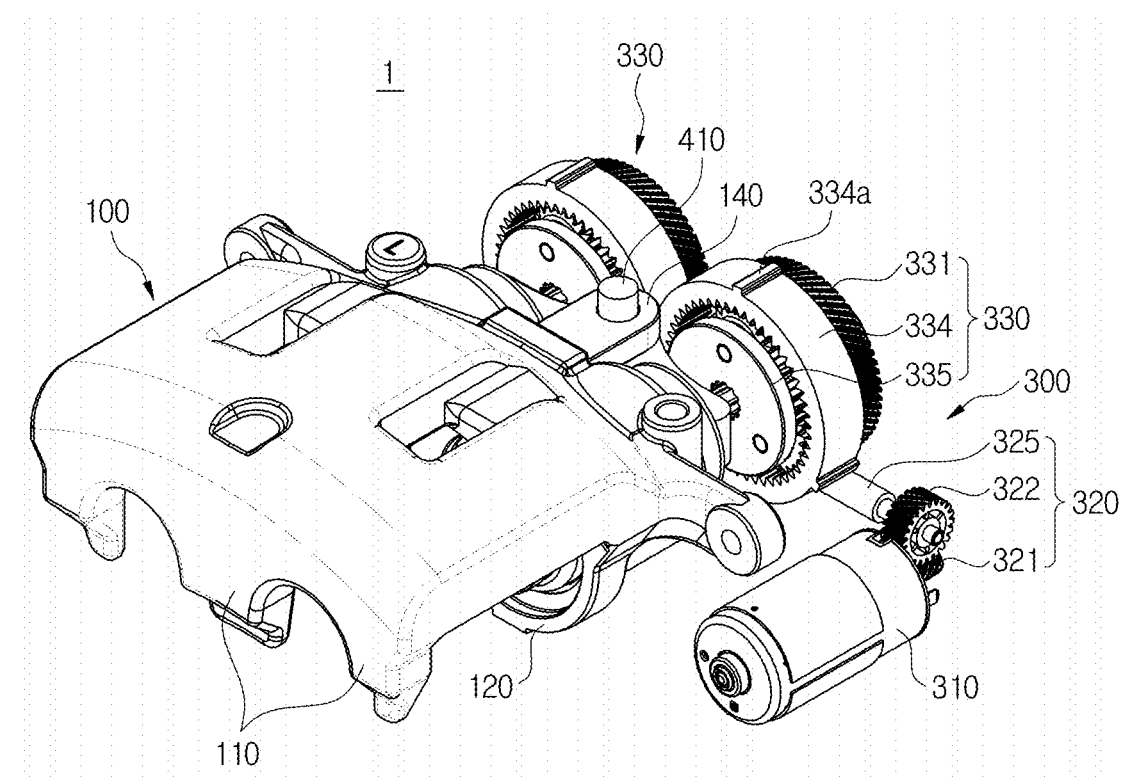

[FIG. 2]
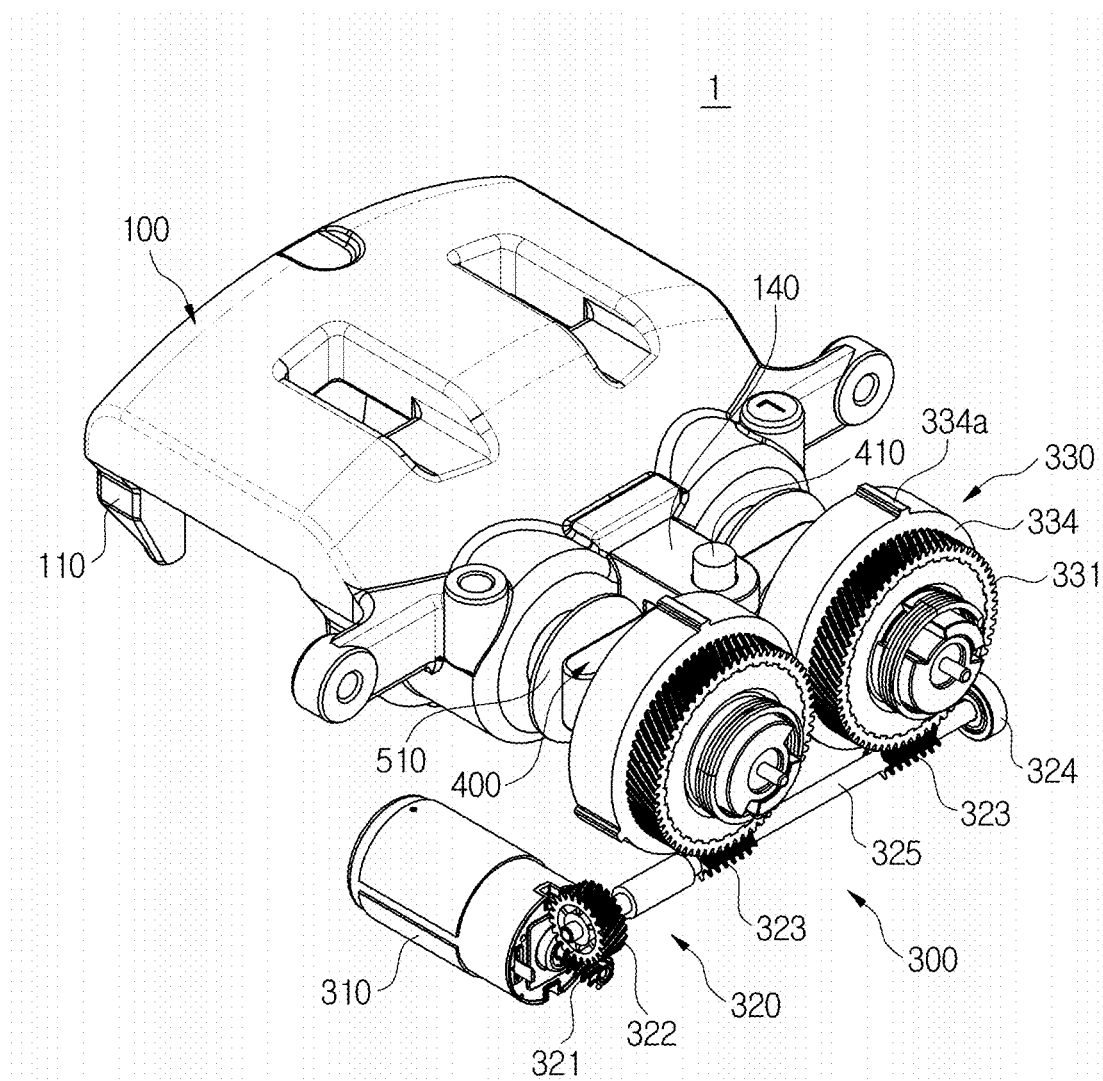

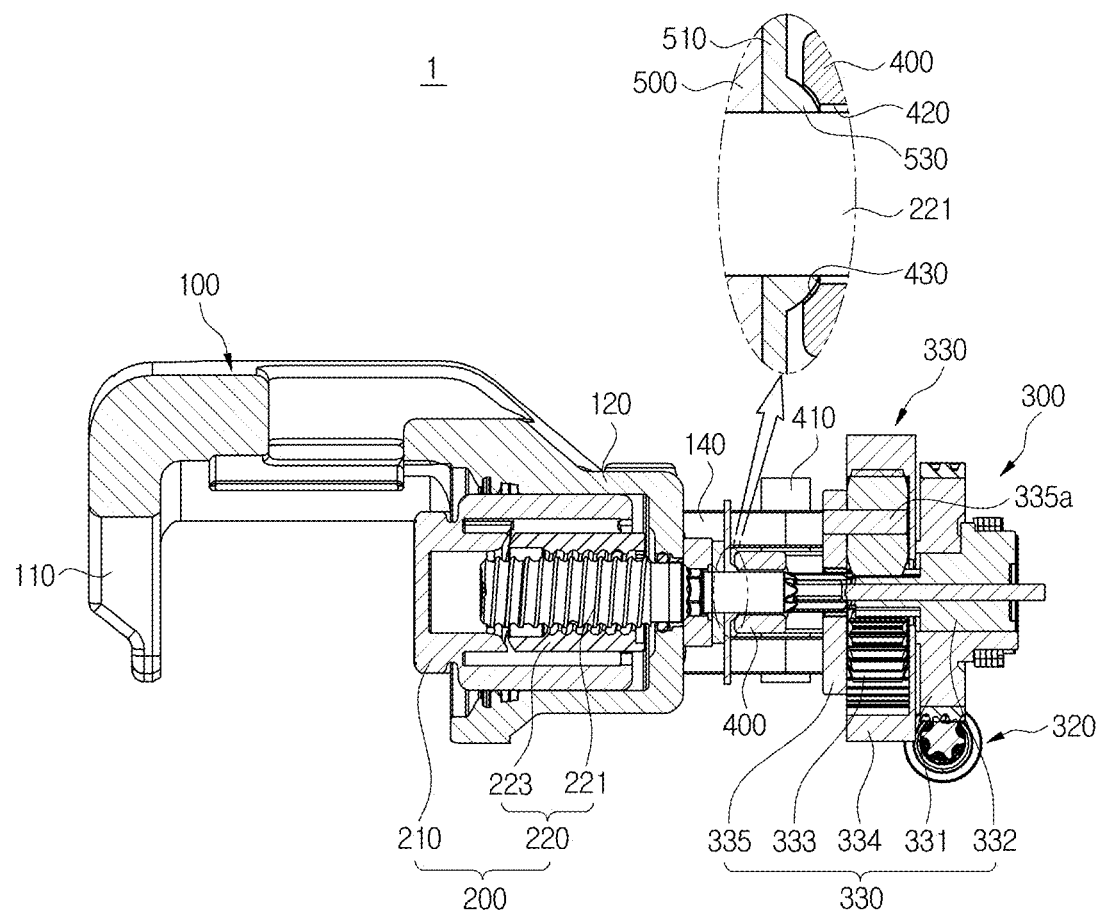
[FIG. 3]

[FIG. 4]
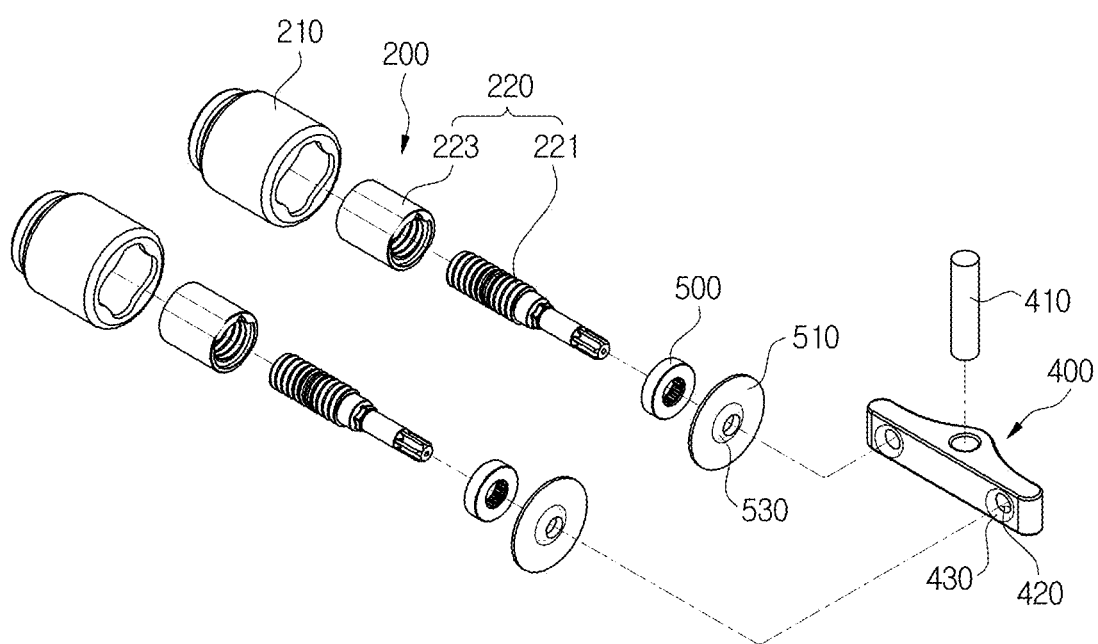

[FIG. 5]
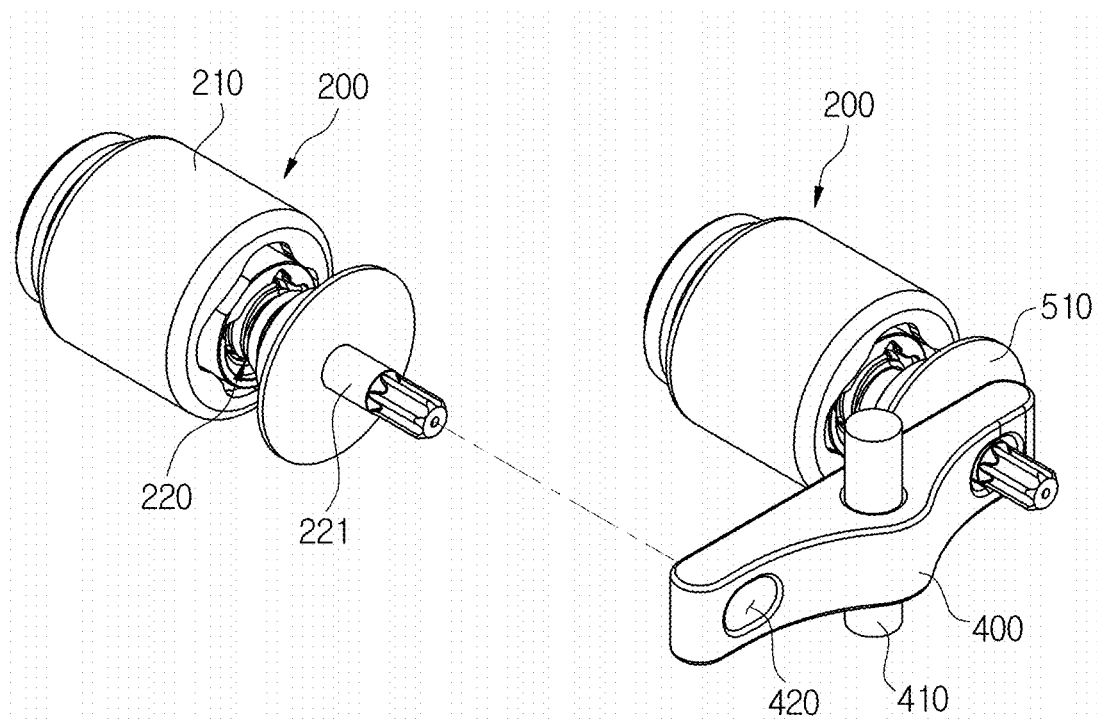

[FIG. 6]
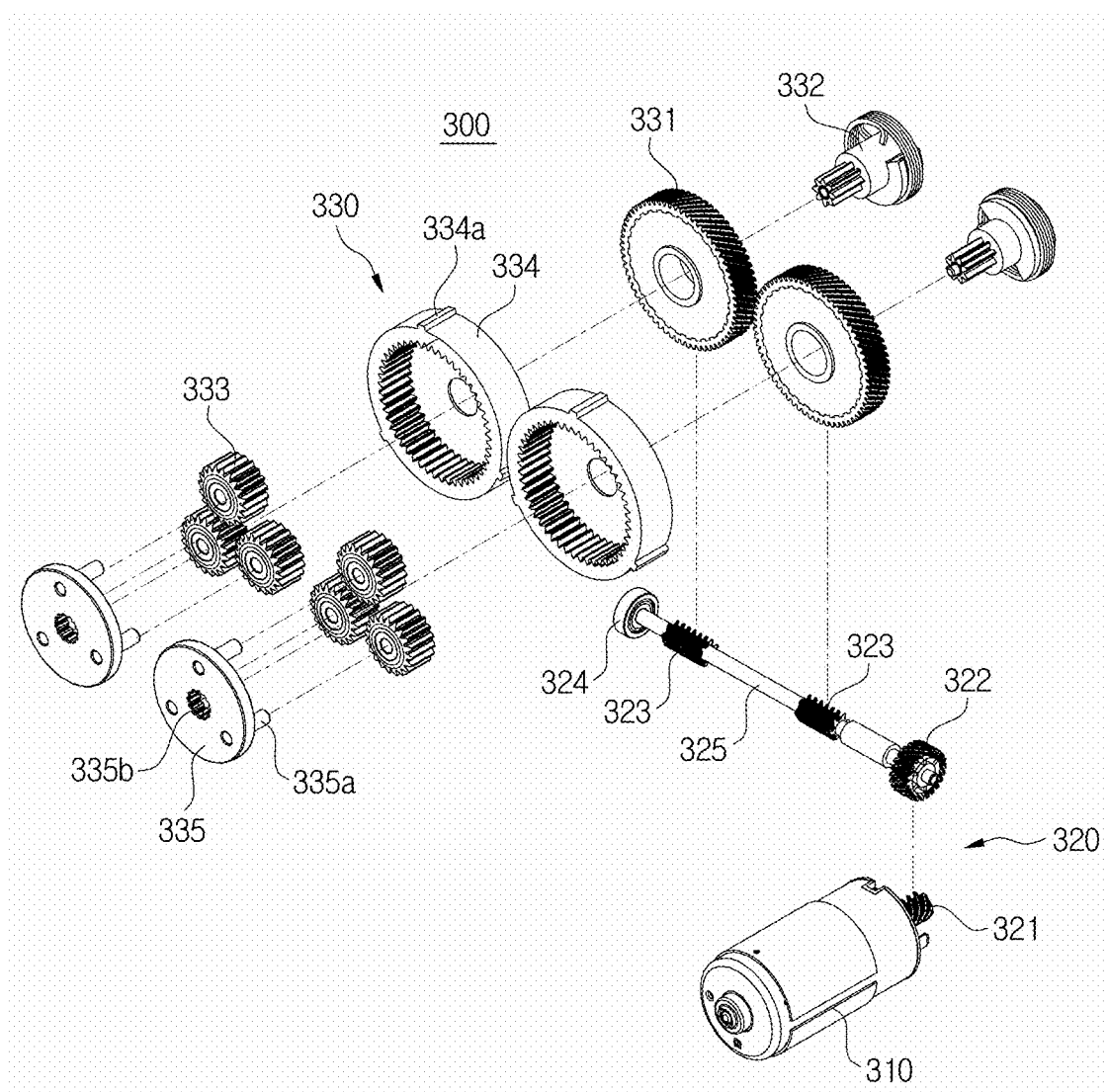

[FIG. 7]
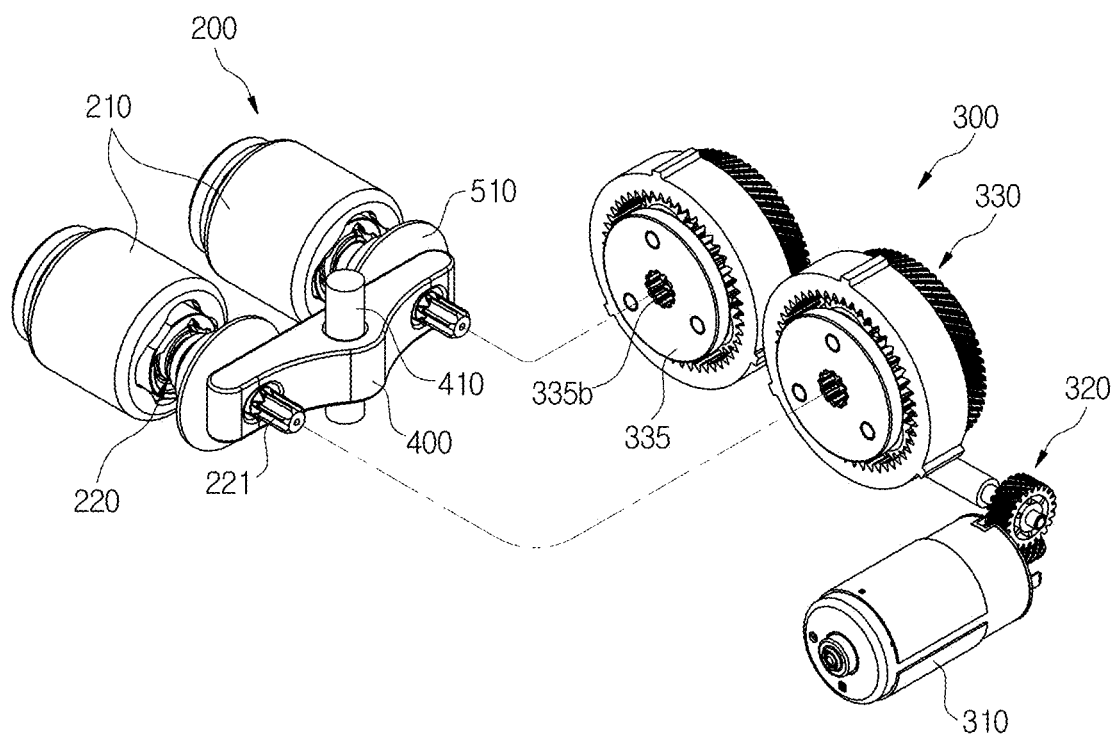

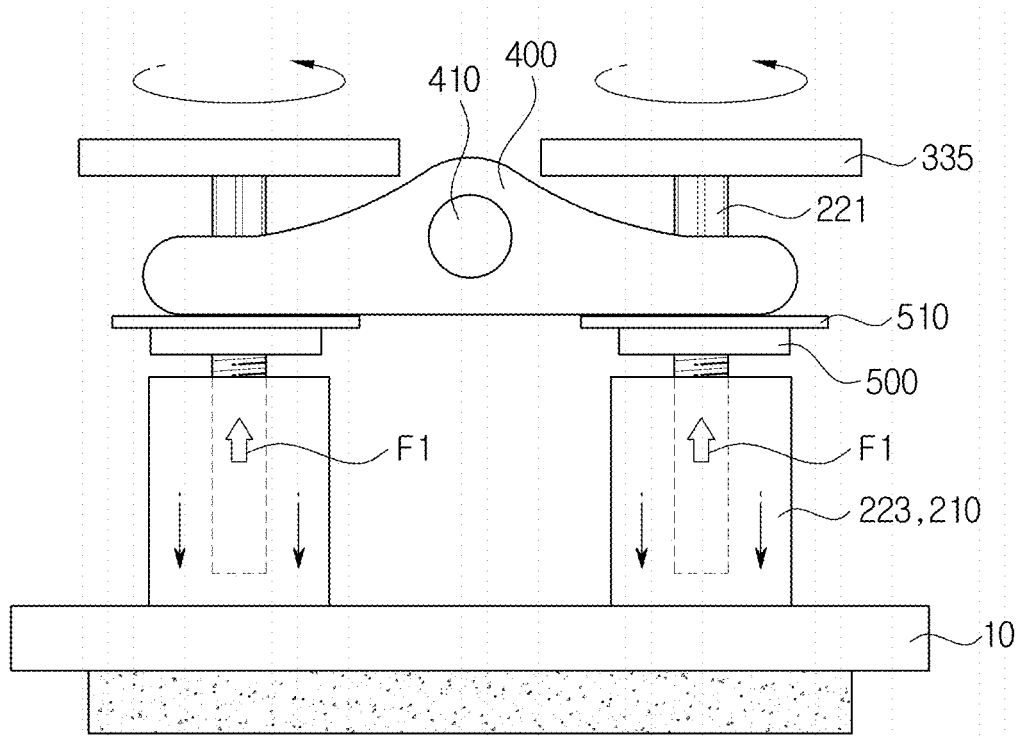
[FIG. 8]

[FIG. 9]
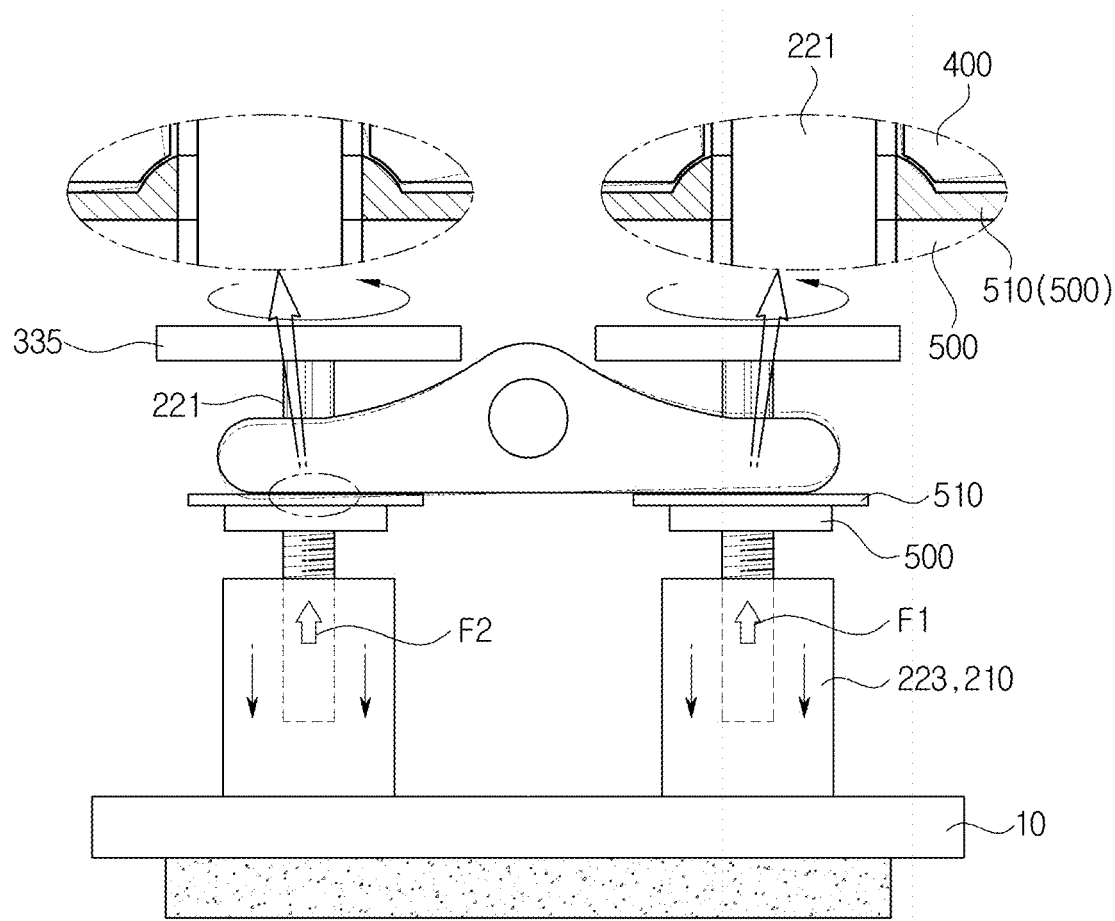

ELECTRIC PARKING BRAKE

CROSS-REFERENCE TO RELATED APPLICATION(S)

This application is based on and claims priority under 35 U.S.C. § 119 to Korean Patent Application No. 10-2021-0034007, filed on Mar. 16, 2021 in the Korean Intellectual Property Office, the disclosure of which is incorporated herein by reference in its entirety.

TECHNICAL FIELD

The disclosure relates to an electric parking brake, and more particularly, to an electric parking brake in which a caliper brake having two pistons applies a uniform load to the two pistons by operation of a motor and realizes a parking function.

BACKGROUND

In general, a brake device is a device that stops a vehicle from moving during braking or parking, and serves to hold wheels of the vehicle from rotating.

Recently, an Electric Parking Brake (EPB) system for electrically controlling operation of a parking brake has been widely used. The EPB is mounted on a conventional caliper brake to perform a function of the parking brake. Electric caliper brakes include a cable puller type, a motor-on-caliper (MOC) type, and a hydraulic parking brake type.

For example, Korean Patent Publication No. 10-2011-0072877 (Jun. 29, 2011) relates to a MOC-type EPB. The document discloses a structure that a motor generating power is connected to an actuator, and the power generated from the motor is decelerated while increasing torque using a plurality of gears to cause a piston to press against brake pads, thereby performing a braking operation.

On the other hand, vehicles, such as a large truck, requiring a large braking force are provided with a plurality of pistons (usually two pistons are applied) to perform a braking operation.

However, when a plurality of pistons are provided and a driving force thereof is transmitted from a single actuator, the load is non-uniformly transmitted to the plurality of pistons due to a non-uniform initial position of the pistons, so that several problems occurs for example, uneven wear of brake pads due to asymmetry, uneven wear of gears, and overload of the motor. As a result, parking performance is deteriorated.

To solve the problems, the same number of actuators as the pistons are provided to transmit power to each of the plurality of pistons, but weight and cost are increased and the application is difficult due to a narrow installation space.

SUMMARY

An aspect of the disclosure is to provide an electric parking brake that applies a uniform load to a plurality of pistons through one actuator and implements a parking function.

Additional aspects of the disclosure will be set forth in part in the description which follows and, in part, will be obvious from the description, or may be learned by practice of the disclosure.

In accordance with an aspect of the disclosure, an electric parking brake includes a pair of pressing portions provided in a caliper housing to convert rotational motion into linear motion to press a brake pad; an actuator configured to transmit power to the pair of pressing portions; and a load control portion provided rotatably between the pair of pressing portions and the actuator, the load control portion applying a uniform load to the pair of pressing portions by pressing any one of the pair of pressing portions that generates a less load during braking operation.

The caliper housing may include a pair of coupling parts protruding from the rear thereof, and the load control portion is provided between the pair of coupling parts rotatably based on a pin coupled to a center thereof, and opposite ends of the load control portion is provided to face the pair of pressing portions based on the center thereof.

A thrust bearing configured to support a load according to axial force may be provided on a rear of the pair of pressing portions, respectively, and the load control portion and the thrust bearing may be in curved surface contact with each other by means of a curved surface contacting means.

The curved surface contacting means may include a curved surface contacting protrusion protruding from a center portion of an outer surface of the thrust bearing to form a curved surface, and a curved surface contacting groove formed to be in contact with the curved surface contacting protrusion on the load control portion facing the curved surface contacting protrusion.

The pair of pressing portions may include a piston slidably inserted into a cylinder part of the caliper housing, and a power transmission including a spindle rotating by receiving driving force from the actuator within the cylinder part, and a nut connected to the spindle and provided on the inside of the piston to press the piston or release the pressure of the piston while moving forward or backward by forward and reverse rotation of the spindle.

A through-hole may be provided respectively at the opposite ends of the load control portion so that a part of the spindle passes through and is connected to the actuator.

The actuator may include a motor; a power connecting portion connected to a rotation shaft of the motor; and a reduction device connected to the power connecting portion to transmit rotational force of the motor to the pair of pressing portions, respectively.

The power connecting portion may include a power transmission shaft having a predetermined length and provided between the motor and the reduction device; a first helical gear coupled to the rotation shaft of the motor; a second helical gear provided on one end of the power transmission shaft and meshed with the first helical gear; a pair of worm shaft gears provided on the power transmission shaft and connected to the reduction device; and a bearing portion provided on the power transmission shaft to rotatably support the power transmission shaft.

The reduction device may include a worm wheel gear meshed with the pair of worm shaft gears; a sun gear coupled to a center of the worm wheel gear and rotating together as the worm wheel gear rotates; a plurality of planetary gears meshed with an outer side of the sun gear; a ring gear provided as an internal gear to accommodate the plurality of planetary gears; and a carrier supporting rotatably the plurality of planetary gears and installed to rotate coaxially with the sun gear to output rotational power.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a perspective view illustrating an electric parking brake according to an embodiment of the disclosure;

FIG. 2 is a rear perspective view illustrating an electric parking brake according to an embodiment of the disclosure;

FIG. 3 is a side cross-sectional view illustrating an electric parking brake according to an embodiment of the disclosure;

FIG. 4 is an exploded perspective view illustrating a state in which a pair of pressing portions and a load control portion provided in an electric parking brake according to an embodiment of the disclosure are assembled;

FIG. 5 is an assembled perspective view of FIG. 4;

FIG. 6 is an exploded perspective view illustrating an actuator provided in an electric parking brake according to an embodiment of the disclosure;

FIG. 7 is a partially-cut perspective view illustrating a state in which a deceleration device of an actuator and a pair of pressing portions provided in an electric parking brake according to an embodiment of the disclosure are assembled;

FIG. 8 is a schematic view illustrating a state in which a uniform load is generated in a pair of pressing portions when an electric parking brake according to an embodiment of the disclosure is operated; and FIG. 9 is a schematic view illustrating a state in which different loads are generated in a pair of pressing portions to cause a load control portion to be operated when an electric parking brake according to an embodiment of the disclosure is operated.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a perspective view illustrating an electric parking brake according to an embodiment of the disclosure, FIG. 2 is a rear perspective view illustrating an electric parking brake according to an embodiment of the disclosure, FIG. 3 is a side cross-sectional view illustrating an electric parking brake according to an embodiment of the disclosure, FIG. 4 is an exploded perspective view illustrating a state in which a pair of pressing portions and a load control portion provided in an electric parking brake according to an embodiment of the disclosure are assembled, FIG. 5 is an assembled perspective view of FIG. 4, FIG. 6 is an exploded perspective view illustrating an actuator provided in an electric parking brake according to an embodiment of the disclosure, and FIG. 7 is a partially-cut perspective view illustrating a state in which a deceleration device of an actuator and a pair of pressing portions provided in an electric parking brake according to an embodiment of the disclosure are assembled.

Referring to FIGS. 1 to 7, an electric parking brake (EPB) 1 according to an embodiment of the disclosure may include a pair of pressing portions 200, an actuator 300, and a load control portion 400. Furthermore, the EPB 1 may further include a carrier (not shown) on which a pair of brake pads are installed to press a disc (not shown) rotating together with wheels of a vehicle, a caliper housing 100 slidably installed on the carrier to operate the pair of brake pads, and an electronic control unit (ECU) (not shown) for controlling operation of the actuator 300. Herein, the pair of pressing portions 200, the actuator 300, and the load control portion 400 may be installed in the caliper housing 100 to implement a parking braking force.

The caliper housing 100 includes a pair of finger parts 110 bent downward on a front side (left side with reference to FIG. 3) to operate the pair of brake pads that constituted of an outer brake pad and an inner brake pad, and a cylinder part 120 in which the pair of pressing portions 200. The caliper housing is slidably fastened to the carrier. The cylinder part 120 and the finger part 110 are integrally formed. The pair of brake pads is pressed through a piston 210 provided in the cylinder part 120 and the finger part 110 of the caliper housing 100 to rub against the disc, thereby performing a braking operation. Since the configuration of the caliper brake is a well-known technologies, a detailed description thereof will be omitted.

On the other hand, a coupling part 140 for coupling with the load control portion 400 to be described later is provided on a rear side (right side with reference to FIG. 3) of the caliper housing 100. The coupling part 140 is provided as a pair, and the pair of coupling parts 140 are formed to be spaced apart from each other at regular interval in a vertical direction. The structure of installing the load control portion 400 on the coupling parts 140 will be described again below.

The pair of pressing portions 200 may be installed in the caliper housing 100 to receive power from the actuator 300 to convert a rotational motion into a linear motion. In other words, the pair of pressing portions 200 are provided to press the brake pads (refer to 10 in FIG. 8) that generates contact friction with the disk (not shown) of the vehicle. The pair of pressing portions 200 may be arranged in parallel in the cylinder parts 120. For example, the pair of pressing portions 200 are symmetrically arranged on left and right sides relative to a center part of the brake pad 10. Accordingly, the pair of pressing portions 200 receives power from the actuator 300 and presses the brake pads 10 with the same pressure load to generate a parking braking force using friction between the brake pads 10 and the disc.

The pair of pressing portions 200 includes the piston 210 and a power transmission 220, respectively. The pair of pressing portions 200 are provided to have the same configuration as each other, description will be made based on any one pressing portion.

The pressing portion 200 may include the piston 210 slidably inserted into the cylinder part 120 of the caliper housing 100, and the power transmission 220 that receives a driving force from the actuator 300 to convert rotational motion into linear motion to press the piston 210 or release the pressed pressure of the piston 210.

The power transmission 220 may include a spindle 221 that rotates by receiving a driving force within the cylinder part 120, and a nut 223 that is connected to the spindle 221 and moves forward or backward by forward and reverse rotation of the spindle 221, and a plurality of balls (not shown) interposed between the spindle 221 and the nut 223. In this case, the nut 223 may be provided to limit rotation thereof inside the piston 210. The power transmission 220 may be provided as a ball-screw type converter for converting a rotational motion of the spindle 221 into a linear motion.

The spindle 221 has a certain length, and a thread may be formed on an outer circumferential surface for coupling with the nut 223. The nut 223 is coupled to one side (front side which is the left side based on FIG. 3) of the spindle 221, and the other side (rear side which is the right side based on FIG. 3) thereof is connected to the actuator 300 to receive a driving force. For example, the other side of the spindle 221 may be coupled to a carrier 335 from which a driving force is output from an actuator 300 to be described later in a spline manner. Furthermore, the other side of the spindle 221 may be connected to the actuator 300 passing through the load control portion 400 to be described later.

The nut 223 may have a thread formed therein so as to mesh with the thread of the spindle 221 via a ball (not shown). The nut 223 may be provided inside the piston 210 in a state in which rotation thereof is restricted. Accordingly, the nut 223 moves linearly according to the forward and reverse rotation directions of the spindle 221 to press the piston or release the pressure of the piston 210.

The actuator 300 may include a motor 310, a reduction device 330 that is connected to the pair of pressing portions 200 to transmit rotational force of the motor 310, and a power connecting portion 320 that connects a rotation shaft of the motor 310 and the reduction device 330. Meanwhile, although not shown, the actuator 300 may be accommodated in an actuator housing and installed outside the rear of the caliper housing 100 or in the vehicle.

The motor 310 receives power by operating a switch (not shown) provided on a driver seat of the vehicle and converts electrical energy into mechanical rotational kinetic energy. The control of braking operation according to an operation signal of the switch may be performed by the ECU (not shown) of the vehicle.

The power connecting portion 320 directly connects the motor 310 and the reduction device 330 to transmit the rotational force of the motor 310 to the reduction device 330. To this end, the power connecting portion 320 includes a power transmission shaft 325 which has a certain length and is provided between the motor 310 and the reduction device 330, a first helical gear 321 coupled to a rotation shaft (not shown) of the motor 310, a second helical gear 322 which is installed at one end of the power transmission shaft 325 and meshes with the first helical gear 321, a worm shaft gear 323 which is installed on the power transmission shaft 325 to connect to the reduction device 330, and a bearing portion 324 which is provided on the power transmission shaft 325 to rotatably support the power transmission shaft 325. Herein, the bearing portion 324 is illustrated as being installed only at the other end of the power transmission shaft 325, it is not limited thereto. In other words, the bearing portion 324 may be installed in a suitable position in a longitudinal direction of the power transmission shaft 325 so that the power transmission shaft 325 may rotate stably. Meanwhile, because a pair of reduction devices 330 to be described later is provided as a pair in order to connect to the pair of pressing portions 200, respectively, the worm shaft gear 323 may also be provided as a pair. Accordingly, the pair of worm shaft gears 323 are provided to be spaced apart from each other by a certain interval so as not to interfere with the pair of reduction gears 330 when connected thereto.

The first helical gear 321 has a center coupled to the rotation shaft of the motor 310 to rotate, and the second helical gear 322 meshed with the first helical gear 321 rotates while changing the rotation direction thereof to a direction perpendicular to the rotation shaft of the motor 310. Changing of the rotation direction using a helical gear may reduce noise considerably because meshing rate is better than that of a spur gear, and when gear ratio is adjusted, it may also be used as a deceleration function.

The reduction device 330 is connected to the power connecting portion 320 to transmit power to the pair of pressing portions 200. Accordingly, the reduction device 330 may be provided as a pair in order to connect to the pair of pressing portions 200, respectively. Since the pair of reduction devices 330 are provided to have substantially the same structure, the following description will be based on any one reduction device.

The reduction device 330 may include a worm wheel gear 331 meshed with the worm shaft gear 323, a sun gear 332 rotating together with the worm wheel gear 331, a plurality of planetary gears 333 meshed with an outer side of the sun gear 332, a ring gear 334 formed as internal gears to accommodate the plurality of planetary gears 333, and a carrier 335 that rotatably supports the plurality of planetary gears 333 and is installed to rotate coaxially with the sun gear 332 and outputs rotational power.

The worm wheel gear 331 is meshed with the worm shaft gear 323 to receive rotational force to rotate. The sun gear 332 is coupled to a center of the worm wheel gear 331 so that the sun gear 332 rotates together with the rotation of the worm wheel gear 331.

The sun gear 332 may be coupled passing through the center of the worm wheel gear 331. The sun gear 332 may have a body portion coupled to the worm wheel gear 331, and a portion thereof where gear teeth are formed is exposed from the worm wheel gear 331 to be meshed with the plurality of planetary gears 333. Preferably, when the sun gear 332 is coupled to the worm wheel gear 331, the portion of the sun gear 332 where the gear teeth are formed may be provided to be positioned inside the ring gear 334.

The plurality of planetary gears 333 are provided as three in consideration of efficiency and economic feasibility, and three planetary gears are respectively rotatably provided on branch shafts 335a in three directions branched from the carrier 335.

The ring gear 334 penetrates vertically, accommodates the plurality of planetary gears 333 thereinside, and having an internal gear is provided to mesh with the plurality of planetary gears 333. The ring gear 334 may have a protrusion 334a protruding from an outer surface thereof to be fixed to the actuator housing (not shown). Accordingly, as the sun gear 332 rotates, the plurality of planetary gears 333 may rotate and revolve within the ring gear.

The carrier 335 may be made in the form of a disk, on one surface thereof are provided the plurality of planetary gear branch shafts 335a spaced apart from each other by a certain interval along a circumferential direction, and the center thereof may be an output hole 335b coupled to the spindle 221 of the pressing portion 200. In this case, the output hole 335b is formed coaxially with the sun gear 332.

Meanwhile, the output hole 335b may be splined with the spindle 221 in order to transmit rotational force to the spindle 221, or may be coupled to mesh with the spindle 221 through gear teeth. Accordingly, as the carrier 335 rotates, the spindle 221 may rotate together therewith.

The load control portion 400 is rotatably installed between the pair of pressing portions 200 and the actuator 300 and is provided to apply a uniform load to the pistons 210 respectively provided in the pair of pressing portions 200 by pressing the pressing portion 200 on the side that generates a less load during braking operation. More specifically, the load control portion 400 has a predetermined length and may be rotatably coupled to the caliper housing 100. As shown in drawings, at the rear of the caliper housing 100, the pair of coupling parts 140 spaced apart from each other in the vertical direction and protruded are provided. The load control portion 400 is provided between the pair of coupling parts 140 rotatably based on a pin 410 coupled to a center of the load control portion. The pin 410 passes through the pair of coupling parts 140. Furthermore, opposite ends of the load control portion 400 coupled to the caliper housing 100 are provided to face the pair of pressing portions 200.

Meanwhile, because the load control portion 400 is provided between the pair of pressing portions 200 and the actuator 300, through-holes 420 may be formed on opposite sides of the load control portion 400 so that the driving force generated from the actuator 300 is transmitted to the pair of pressing portions 200. In other words, a part of the spindle 221 passes through the through-hole 420 and is connected to the actuator 300 to receive a rotational force.

According to the disclosure, a thrust bearing 500 may be provided between the rear of the pair of pressing portions 200 and the load control portion 400 in order to apply a uniform load to the pistons 210 of the pair of pressing portions 200. Herein, the thrust bearing 500 serves to support an axial force generated during the braking operation. The thrust bearing 500 may be provided to be in curved contact with the load control portion 400 by means of a curved surface contacting means. As shown in drawings, a washer 510 provided on one side of the thrust bearing 500 opposite to the load control portion 400 and the load control portion 400 are shown to be in curved contact with each other as the curved surface contacting means, but are not limited thereto. Also, they may be provided to be in directly curved contact with the thrust bearing 500.

The curved surface contacting means includes a curved surface contacting protrusion 530 protruding from a center portion of one side surface of the washer 510 of the thrust bearing 500 to form a curved surface, and a curved surface contacting groove 430 formed to be in contact with the curved surface contacting protrusion 530 on the load control portion 400 facing the curved surface contacting protrusion 530. As shown in drawings, the curved surface contacting protrusion 530 is formed on a perimeter of a central hole through which the spindle 221, and the curved surface contacting groove 430 is formed on an inlet side of the through-hole 420 of the load control portion 400. Accordingly, when rotating around the pin 410, the load control portion 400 may be rotated at a predetermined angle while in smooth contact with the curved surface contacting means, and the piston of the pressing portion 200 on the side pressed by the load control portion 400 may be rapidly moved.

Hereinafter, an operation of the EPB 1 according to an embodiment of the disclosure will be described.

FIG. 8 is a schematic view illustrating a state in which a uniform load is generated in the pair of pressing portions when the EPB according to an embodiment of the disclosure is operated.

Referring to FIGS. 1 to 8, when a driver operates the parking brake after stopping the vehicle, the motor 310 is driven so that the first helical gear 321 coupled to the rotation shaft of the motor 310 rotates together, and thus the second helical gear 322 meshed with the first helical gear 321 is rotated.

As the power transmission shaft 325 rotates together with the second helical gear 322, the pair of worm shaft gears 323 provided on the power transmission shaft 325 rotate together. Next, as the worm wheel gear 331 meshed with the worm shaft gear 323 rotates, the rotational force is output to the spindle 221 through the carrier 335 of the reduction device 330.

As the spindle 221 rotates by receiving the rotational force through the carrier 335, the nut 223 moves in an axial direction, and the nut 223 presses the piston 210, thereby performing parking braking operation.

After the parking braking operation, the motor 310 is stopped, and the rotation of the spindle 221 is prevented by the reduction device 330 and the power connecting portion 320 having a large reduction ratio. Accordingly, a braking state is maintained as long as the motor 310 is not driven again.

As such, because the pair of pressing portions 200 receive power through the actuator 300 and generate a parking braking force through the same driving, the same load is applied to the piston 210 as indicated by the arrow F1, thereby performing stable braking operation.

When releasing a parking braking force, the driver release the braking by manipulating a parking switch on the driver seat. At this time, because the motor 310 rotates in a reverse direction of the rotational direction when parking and the spindle 221 rotates in the reverse direction of the rotational direction when parking, the nut 223 releases the pressure of the piston 210 to release the braking.

On the other hand, when the pair of pressing portions 200 press the brake pads 10 through the piston 210 with the same force, but an initial position of the piston 210 may be non-uniform due to installation errors. As a result, the load is non-uniformly transmitted to the pair of pistons 210, so uneven wear of the brake pads 10, uneven wear of the gear, and overload of the motor 310 occur due to asymmetry. These problems may address by allowing a uniform load to be generated in the pair of pressing portions 200 by the load control portion 400 according to an embodiment of the disclosure.

FIG. 9 is a schematic view illustrating a state in which different loads are generated in the pair of pressing portions to cause a load control portion to be operated when the EPB according to an embodiment of the disclosure is operated.

Referring to FIG. 9, It has been shown that a load is generated in any one of the pair of pressing portions 200 (right side based on FIG. 9) in the direction of the arrow F1, and a load is generated in the other pressing portion 200 (left side based on FIG. 9) in the direction of the arrow F2. At this time, the load of the arrow F1 is provided to receive a greater load than that of the arrow F2. In other words, because the initial positions of the pistons 210 provided in the pair of pressing portions 200 are non-uniform, respectively, the pressing portion 200 on the right side presses the brake pad 10 first, thereby receiving a greater load than pressing portion 200 on the left side. In this case, the load control portion 400 is rotated toward the pressing portion 200 on the left side where a low load is generated.

More specifically, as the pressing portion 200 on the right side receives power, the nut 223 moves and presses the piston 210, so that the load is first generated compared to the pressing portion 200 on the left side. Accordingly, an axial force is generated in the thrust bearing 500 by the load generated in the pressing portion 200 on the right side, and thus the load control portion 400 at the rear of the thrust bearing 500 is pressed in the axial force direction.

The load control portion 400 rotates around the pin 410 coupled to the center thereof and presses the thrust bearing 500 provided on the left side. At this time, the load control portion 400 may be in contact with the washer 510 of the thrust bearing 500 via the curved surface contacting means, thereby rotating smoothly with respect to the center thereof.

As a result, the pressing portion 200 on the left side may press the brake pad 10 by rapidly moving the piston 210 through pressing by the rotation of the load control portion 400. Accordingly, even if a non-uniform load is generated in the pair of pressing portions 200, a uniform load is applied through the load control portion 400 to solve the problems, such as uneven wear of the brake pad, uneven wear of the gear, and overload of the motor. Furthermore, it is possible to generate a stable parking braking force.

As is apparent from the above, the EPB according to an embodiment of the disclosure may transmit the pressed load that is biased to any one of the pair of pressing portions through the load control portions to the other pressing portion, thereby applying a uniform load to the pair of pressing portions and realizing the parking function.

Furthermore, the EPB according to an embodiment of the disclosure may apply the same load to the pair of pressing portions (pistons) through one actuator, thereby reducing manufacturing cost and weight compared to the conventional EPB and improving design freedom.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An electric parking brake, comprising:
   a pair of pressing portions provided in a caliper housing to convert rotational motion into linear motion to press a brake pad;
   an actuator configured to transmit power to the pair of pressing portions; and
   a load control portion provided rotatably between the pair of pressing portions and the actuator, the load control portion applying a uniform load to the pair of pressing portions by pressing any one of the pair of pressing portions that generates a less load during braking operation,
   wherein the caliper housing comprises a pair of coupling parts protruding from the rear of the caliper housing, and
   the load control portion is provided between the pair of coupling parts rotatably based on a pin coupled to a center of the load control portion, and opposite ends of the load control portion is provided to face the pair of pressing portions based on the center of the load control portion.

2. The electric parking brake of claim 1, wherein
   a thrust bearing configured to support a load according to axial force is provided on a rear of the pair of pressing portions, respectively, and
   the load control portion and the thrust bearing are in curved surface contact with each other by means of a curved surface contacting means.

3. The electric parking brake of claim 2, wherein the curved surface contacting means comprising:
   a curved surface contacting protrusion protruding from a center portion of an outer surface of the thrust bearing to form a curved surface, and
   a curved surface contacting groove formed to be in contact with the curved surface contacting protrusion on the load control portion facing the curved surface contacting protrusion.

4. The electric parking brake of claim 1, wherein the pair of pressing portions comprises:
   a piston slidably inserted into a cylinder part of the caliper housing; and
   a power transmission including a spindle rotating by receiving driving force from the actuator within the cylinder part, and a nut connected to the spindle and provided on the inside of the piston to press the piston or release the pressure of the piston while moving forward or backward by forward and reverse rotation of the spindle.

5. The electric parking brake of claim 1, wherein the actuator comprises:
   a motor;
   a power connecting portion connected to a rotation shaft of the motor; and
   a reduction device connected to the power connecting portion to transmit rotational force of the motor to the pair of pressing portions, respectively.

6. An electric parking brake, comprising:
   a pair of pressing portions provided in a caliper housing to convert rotational motion into linear motion to press a brake pad;
   an actuator configured to transmit power to the pair of pressing portions; and
   a load control portion provided rotatably between the pair of pressing portions and the actuator, the load control portion applying a uniform load to the pair of pressing portions by pressing any one of the pair of pressing portions that generates a less load during braking operation,
   wherein the pair of pressing portions comprises:
   a piston slidably inserted into a cylinder part of the caliper housing; and
   a power transmission including a spindle rotating by receiving driving force from the actuator within the cylinder part, and a nut connected to the spindle and provided on the inside of the piston to press the piston or release the pressure of the piston while moving forward or backward by forward and reverse rotation of the spindle, and
   wherein a through-hole is provided respectively at the opposite ends of the load control portion so that a part of the spindle passes through and is connected to the actuator.

7. An electric parking brake comprising:
   a pair of pressing portions provided in a caliper housing to convert rotational motion into linear motion to press a brake pad;
   an actuator configured to transmit power to the pair of pressing portions; and
   a load control portion provided rotatably between the pair of pressing portions and the actuator, the load control portion applying a uniform load to the pair of pressing portions by pressing any one of the pair of pressing portions that generates a less load during braking operation,
   wherein the actuator comprises:
   a motor;
   a power connecting portion connected to a rotation shaft of the motor; and a reduction device connected to the power connecting portion to transmit rotational force of the motor to the pair of pressing portions, respectively, and wherein the power connecting portion comprises:

a power transmission shaft having a predetermined length and provided between the motor and the reduction device;

a first helical gear coupled to the rotation shaft of the motor;

a second helical gear provided on one end of the power transmission shaft and meshed with the first helical gear;

a pair of worm shaft gears provided on the power transmission shaft and connected to the reduction device; and a bearing portion provided on the power transmission shaft to rotatably support the power transmission shaft.

8. The electric parking brake of claim 7, wherein the reduction device comprises:

a worm wheel gear meshed with the pair of worm shaft gears;

a sun gear coupled to a center of the worm wheel gear and rotating together as the worm wheel gear rotates;

a plurality of planetary gears meshed with an outer side of the sun gear;

a ring gear provided as an internal gear to accommodate the plurality of planetary gears; and a carrier supporting rotatably the plurality of planetary gears and installed to rotate coaxially with the sun gear to output rotational power.

\* \* \* \* \*